Sept. 4, 1928.  
H. RENNER  
1,683,488  
IMPREGNATION OF WOOD AND THE LIKE  
Filed Feb. 7, 1925
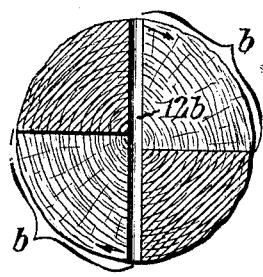
FIG. II
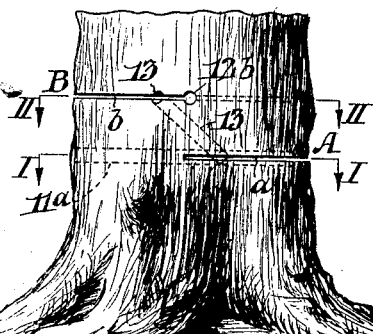
FIG. III
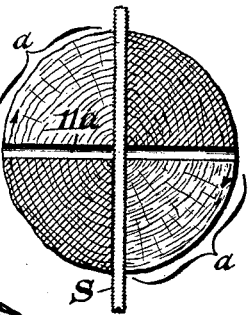
FIG. I
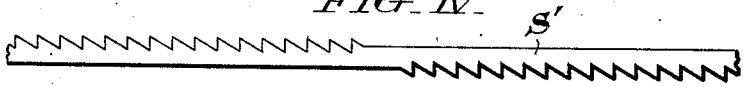
FIG. IV
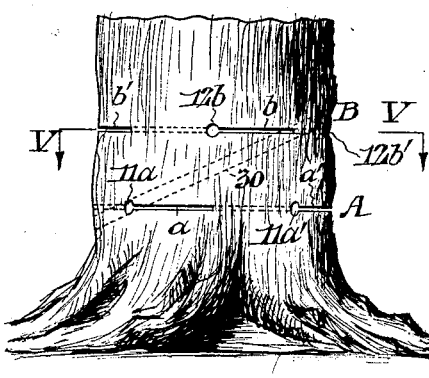
FIG. VI
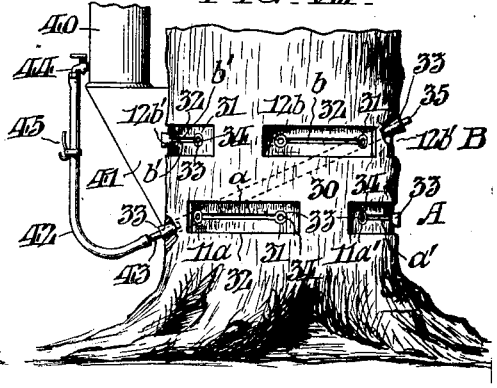
FIG. VIII
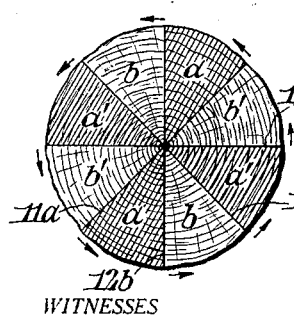
FIG. V
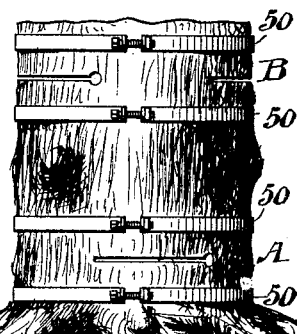
FIG. IX
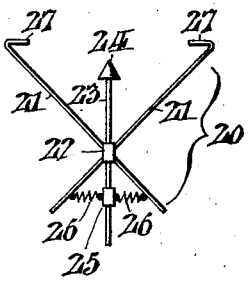
FIG. VII
WITNESSES  
Alfred E. Tschinger  
Thomas W. Kerr, Jr.
INVENTOR:  
Herbert Renner,  
BY  
ATTORNEYS.

Patented Sept. 4, 1928.

1,683,488

UNITED STATES PATENT OFFICE.

HERBERT RENNER, OF PHILADELPHIA, PENNSYLVANIA, ASSIGNOR, BY MESNE ASSIGNMENTS, TO CHEMICOLOR WOOD PRESERVING CO., A CORPORATION OF DELAWARE.

IMPREGNATION OF WOOD AND THE LIKE.

Application filed February 7, 1925. Serial No. 7,522.

My invention relates to the impregnation of wood and the like, especially for the purpose of coloring or preserving it. The invention may also be adapted and applied for other purposes, such as fireproofing, hardening or toughening, etc. By treating the wood while still "alive", I aim to secure thorough penetration by an action similar to the natural circulation or transmigration of sap, without the difficulty and expense involved in impregnating more or less dried or seasoned logs or lumber. I have hereinafter explained my invention with special reference to the dyeing of an entire live tree.

In order to impregnate a standing tree in this manner, and the like applies to the impregnation of a portion such as a limb and its branches, it is necessary, as I have discovered, to supply the dyeing fluid directly to all the sap ducts throughout its cross-section. It does not suffice merely to supply the fluid to a portion of the ducts, and to trust to its being transmitted laterally from them to the others; because even in cases where lateral communication exists, the tendency is for sap to be drawn up directly from the roots, rather than for dye to pass laterally from duct to duct. Accordingly, failure to supply dye directly to substantially all the ducts results at best in irregular and uneven dyeing, with haphazard streaks of undyed wood. On the other hand, it will not do to cut around the tree trunk completely in order to obtain access for the introduction of impregnating fluid to all the ducts, because this would result in felling the tree. Even in cases where a sapless central heart exists, its strength is generally insufficient to keep the tree upright after the surrounding sap wood has been severed.

I have found that these various difficulties can be overcome by severing the sap ducts and supplying the dye at different planes or levels in the height of the tree, so as to completely substitute the fluid for the sap in the natural circulation of the tree while still leaving it strength to stand. This I can do without destroying the lumber value of any substantial length of the tree trunk, or increasing the stumpage materially—if at all—as compared with ordinary good lumbering practice. The number of cuts required is small, and they can be sawed quite easily, rapidly, and inexpensively, even by hand. Severance and dyeing can be controlled and carried to any extent desired. If preferred, ducts can be left unsevered in certain definite areas of the tree trunk, thus giving rise to correspondingly arranged uncolored stripes in lumber eventually cut from the tree; or different dyes can be applied to different areas.

In the drawings, Figs. I and II show horizontal sections through a tree trunk, taken as indicated by the lines I—I and II—II in Fig. III, and illustrating a way of severing its sap ducts.

Fig. III is a fragmentary side view of the lower portion of a tree trunk, showing the relative locations of the areas of severance represented in Figs. I and II.

Fig. IV is a fragmentary side view of a saw blade differing from one shown in Fig. 1.

Fig. V is a diagrammatic plan and sectional view illustrating a somewhat different and generally preferred cutting of a tree, the section being taken as indicated by the line V—V in Fig. VI.

Fig. VI is a fragmentary side elevation of a tree trunk, illustrating one way of making cuts as shown in Fig. V.

Fig. VII is a plan view of a marking instrument useful for the practice of my invention.

Fig. VIII is a fragmentary side view of a tree trunk cut as illustrated in Fig. VI and prepared for the introduction of dye into the cuts, with suitable apparatus for the latter purpose; and Fig. IX is a diagrammatic side view illustrating a method of strengthening or reinforcing a tree trunk prepared for treatment in accordance with my invention.

In preparing a tree for impregnation, I prefer to saw across its sap ducts in a series of sectors in different planes, as more or less diagrammatically indicated in Figs. I, II and V. For complete and uniform staining, the areas of severance may in practice overlap a little at their margins, in order to insure that substantially all the sap ducts (at least) shall be severed. This, of course, ultimately results in killing the tree; but practically, nevertheless, the tree remains "alive" for some little time, in the sense that the rise of its sap continues, and that other fluids will likewise rise in it if suitably supplied. After completing the work of severance, therefore, I proceed to supply the dye or other impregnant to the portions of the severed ducts leading beyond the severances. For this purpose, I prefer to close off or "dam" the cuts or saw kerfs in the trunk along their outer edges, so that these cuts can be filled with liquid dye to the substantial exclusion of air, and the full "drawing" power of the tree thus brought to bear in sucking up the dye. The preparation of the tree being thus completed, I may supply the dye to the interior of the cuts from a conveniently elevated reservoir, as generally illustrated in Fig. VIII, preferably drawing off the air or permitting it to escape from the cuts as the dye enters them.

In Figs. I, II and III, I have illustrated in a general way a method of sawing a tree by hand, in the present instance at two different planes in alternation around the tree. As here shown, the trunk is sawed in opposite quadrants at each of the planes marked A and B in Fig. III. In sawing by hand, I start by boring holes $11^a$ and $12^b$ across the tree trunk at the planes A and B, preferably at right angles to one another. These holes $11^a$ and $12^b$ should be of such size as to accommodate a narrow saw blade S, such as shown in Fig. I, with a clearance of about $\frac{1}{16}''$, say. As here shown, this saw blade S has teeth on both edges, facing in opposite directions. Having inserted the saw S in the hole $11^a$, for example, I reciprocate it back and forth with its opposite edges against opposite sides of the two ends of the hole, so that as the sawing progresses, the blade swings about the central axis of the tree as indicated by the curved arrows in Fig. I, thus making the opposite sector cuts marked $a$, $a$ in Fig. I. As shown in this figure, the saw S is just at the conclusion of the operation, in a position at right angles to the hole $11^a$ from which the cutting was started. Having withdrawn the saw S and inserted it in the other hole, $12^b$, I repeat the operation, making the opposite sector cuts marked $b$, $b$ in Fig. II. As indicated by the curved arrows in Figs. I and II, the two cuttings $a$, $a$ and $b$, $b$ are preferably made in the same rotary or angular direction around the tree trunk.

Initially boring the tree in different directions not only allows the sawing to be done always in the same rotary or angular direction, thus reducing the chance of error, but also allows each hole $11^a$, $12^b$ to serve as a gauge mark to indicate how far the saw cut from another hole should be carried, i. e., as shown in Fig. III, the cut from the hole $11^a$ is terminated directly under the hole $12^b$, and the cut from the hole $12^b$ is terminated directly above the hole $11^a$.

From the foregoing description and a comparison of Figs. I, II, and III, it will be seen that the areas of severance alternate or are relatively staggered as between the planes A and B, in the sequence $a$, $b$,—$a$, $b$ around the tree. Accordingly, the upper and lower portions of the tree are left with interlocked sector-shaped tenons (so to term them), which are laterally united. The interlocking of these tenons increases the effective strength of the tree as compared with what would be afforded by the mere union of their sides.

If desired, a saw blade S' such as shown in Fig. IV may be employed, with oppositely facing teeth on opposite sides of its two ends only.

After cleaning out the saw kerfs $a$, $a$ and $b$, $b$ and the holes $11^a$, $12^b$ to free them of sawdust and shavings, the outer edges of the kerfs may be tamped or otherwise closed with impervious strips or plastic material, or caulked as hereinafter described in connection with Fig. VIII, and both ends of the holes $11^a$ and $12^b$ stoppered or plugged. The preparation of the tree being thus completed, liquid dye may be introduced into the saw kerfs and holes, as by means of tubing from a supply tank conveniently elevated as hereinbefore indicated, and as more particularly described hereinafter in connection with Fig. VIII. A separate supply connection may be made to each of the planes of section A and B; or a hole 13 may be bored diagonally through the tree trunk to connect the sections, so that only one connection to the dye tank will be needed. In either case, the dye solution is brought directly into contact with the entire cellular or duct structure of the tree in a transverse section at its base.

Thus the dye is directly supplied to substantially every duct in the cross-section of the bole, trunk, or limb operated on, and rises in them in substantially the same way as the sap in the normal life of the tree. The causative and controlling factor in this rise of the dye seems to be the sun's influence on the exposed surfaces (leaves) of the tree. Ultimately, if supplied long enough, the dye permeates even the smallest twigs and the leaves: the time required for this may vary from some hours for a very small tree to a period of days for a large one. All connection with the roots is effectually cut off by the saw cuts, which thus virtually serve as a barrier to prevent dilution of the dye that rises into the trunk with sap from below. Owing to the drawing up of the sap in the ducts above the severances and the entrance of air behind it during the unavoidable delay between severance and actual supply of the dye, the dye rising in the ducts seems to be separated from the sap above by a short interval of air, and hence does not mingle with it or undergo dilution by it. While such an interval between sap and dye is not of vital consequence, it is desirable, nevertheless, to prevent access of air to the sap ducts after the supply of dye begins, since this would probably result in some failure of the dye to rise in the ducts, and hence in irregular dyeing of the wood. Also the introduction of the dye should not be unduly delayed after severance is once begun, lest the sap should work up so far above the first cuts that the dye might afterward fail to follow it as desired.

Figs. V to VII illustrate the severance of the sap ducts in a larger number of sectors than in Figs. I, II and III; in the present instance, again at two planes A and B. As shown, the sap ducts are severed in two pairs of opposite sectors—$a$, $a$, $a'$, $a'$ and $b$, $b$, $b$, $b'$—at each of the planes A and B, and the individual sectors alternate as between the planes around the tree in the sequence $a$, $b$, $a'$, $b'$, $a$, $b$, $a'$, $b'$. As a result, the number of interlocking tenons is doubled as compared with Figs. I to III, and the strength of the tree to resist blowing over in high winds is greatly increased: i. e., there is less tendency for the tenon sectors to break apart by radial wedging or circumferential prying action. Accordingly, the plane of severance A and B may in practice be much closer together in proportion to the diameter of the tree than when the number of sectors is smaller and the angular extent of each sector is greater. Thus loss of valuable wood in stumpage may be minimized; the risk of trees blowing over before dyeing is completed may be greatly reduced; and operations may be made relatively independent of whether the weather is calm or windy.

When the tree is to be sawed by hand in this manner, it is convenient to proceed, as before, by boring approximately diametral holes across it in each of the planes A and B. In this instance, however, two intersecting holes $11^a$ and $11^{a'}$ are preferably bored at right angles to one another at the plane A, and two intersecting holes $12^b$ and $12^{b'}$ at right angles to one another at the plane B; the holes at each plane preferably bisecting the angle between those at the other plane. The lower plane A may be only a few inches above the ground, as close as it is convenient to work, in fact, for trees of ordinary size. The distance between the planes A and B may be from 8 to 12 inches, according to the size of the tree and the strength characteristics of its wood, etc. For determining the relative positions of the several holes, an instrument 20 such as illustrated in Fig. VII may conveniently be employed.

As here shown, the instrument 20 consists of two legs 21, 21 pivotally mounted on a block 22 bored to take a marker rod 23 with a sharp marking point 24. The parts 21, 21 and 23 may be made of ⅜ inch iron pipe. The marking rod 23 is arranged to slide through the block 22, as well as through a block 25 connected to the legs by counterpart helical tension springs 26, 26, so that this marking rod will always occupy a position bisecting the angle between the legs 21, 21. The ends 27, 27 of the legs 21 may be bent toward one another at about a 45° angle, so as to be readily inserted in the opposite ends of a hole. A convenient method of working is as follows: A first diametral hole $11^a$, for instance, having been bored in the lower plane A, for instance, the instrument 20 is applied thereto as above indicated and its point 24 is forcibly driven into the tree trunk to make a mark indicating the point where the second hole $11^{a'}$ is to be bored in the same plane. This second hole $11^{a'}$ having been bored accordingly, the instrument 20 may be applied to the ends of the holes $11^a$ and $11^{a'}$ to determine the position of the first hole to be bored in the plane B: that is, the third hole $12^b$, say, is bored eight inches above a point marked by the rod 23 midway between the ends of the holes $11^a$ and $11^{a'}$. The position of a second hole $12^{b'}$ in the plane B may then be determined in the same way as the position of the hole $11'$, and this final hole $12^{b'}$ bored accordingly.

The saw blade S or S' may be used in each of the holes thus bored, as described above in connection with Figs. I to III, being operated and swung about the axis of the tree to cut always in the direction of the arrows in Fig. V. In this way, a pair of vertically opposite 45° sectors will be cut at each operation, each cut terminating directly under one of the holes in the plane above or below it, as the case may be. It is convenient, in order to obviate possible errors in cutting, to make the cuts alternately in the two planes A and B, in the sequence $a\ a$, $b\ b$, $a'\ a'$, $b'\ b'$. As shown in Fig. VIII, a hole 30 is preferably bored diagonally across the tree, so as to connect all the cuts at the planes A and B. Additional holes 31 are preferably bored at the terminal ends of the various saw kerfs, for a purpose to be hereinafter described: this may be done either before or after the sawing of said kerfs. The holes 31 need not necessarily extend all the way across the tree; on the contrary, a depth of a couple of inches is sufficient. All kerfs and holes are carefully cleaned, as before, and preferably washed out with water.

Boring, sawing, and cleaning having been completed, a strip of bark about an inch wide is preferably removed along each of the saw kerfs, as shown at 32 in Fig. VIII, so as to lay bare the openings of the latter in the wood. These openings are then caulked with any suitable material. The various holes are all stoppered with rubber stoppers 33, each pierced with a single hole 34. Preparatory to the introduction of the dye, a stream of water may be fed through the system from the lower end of the boring 30, so as to trickle out through the holes 34 and thus clear the cuttings of any possible woody residue that might obstruct them. The stopper holes 34 may then be closed with suitable plugs such as short pieces of glass 35.

The preparation of the tree having thus been completed, and the freedom of circulation tested, the liquid dye may be introduced. For this purpose, a supply tank 40 may be mounted on the pedestal 41, a little above the upper plane B, and connected by a flexible rubber tube 42, with a glass nipple 43, to the lower end of the diagonal bore 30. The tank valve 44 and the pinch cock 45 on the tubing 42 having been opened, the dye begins to flow into the cuttings. The hole 34 in the plug 33 at the upper end of the diagonal bore 30 may be left open until the dye makes its appearance there, to permit discharge of air from the cuttings. The dye will rise in the sap ducts as already described.

In this manner, wood may be dyed practically any color desired, since a great variety of dyes may be used. Many or most dyes that may otherwise be desirable will in themselves preserve the wood against decay; but other preservatives of suitable character may be associated with almost any dye. The dyeing fluid may be either initially colored, or of such character as to develop color after injection, by reaction with—or in—the wood. For dyeing wood with the color commonly known as "red brown", a solution may be used comprising by weight 36 grams of ferric chloride and 53 grams sodium acetate dissolved in water, with an addition of 10 cc. formic acid of 25% strength, and a final addition of 1,000 cc. water. The formic acid renders the other components stable in water temporarily; but during the drying out of the wood after impregnation with the solution, the formic acid and the acetic acid evaporate, giving rise to the formation of insoluble ferric hydroxide in the wood. For fire-proofing and toughening the wood, aqueous solutions of sodium fluoride or zinc chloride may be used.

In general, as indicated above, the interval between the planes at which a tree is cut depend on the strength characteristics of the wood and the condition of the particular tree being dealt with, etc., as well as on the diameter of the tree. Ordinarily, it may run from ½ to ¾ of the diameter, a foot to eight inches being a fair range for trees of moderate size, as already mentioned. In order to reinforce the tree generally, and preclude checking or splitting of its trunk in the region of cutting and consequent access of air to the sap ducts, it may in some cases be desirable to apply one or more iron bands or braces 50 to the trunk between and/or just beyond the planes or levels of cutting A, B, as illustrated in Fig. IX. This may be done either before the cutting or afterward. Such braces may remain on the tree for a considerable period, if it is desired to leave it to season standing.

Having thus described my invention, I claim:

1. The method of impregnating a standing tree by introduction of impregnating fluid into its sap ducts, which comprises severing substantially all the sap ducts of the tree, part at one plane and part at another in alternation around the tree so as to provide relatively-staggered laterally-uniting tenons, and supplying the fluid to the portions of the severed ducts beyond the severances, so as completely to substitute the fluid for the sap in the circulation of the tree while leaving it strength to stand.

2. The method or step of preparing a tree for impregnation by introduction of impregnating fluid into its sap ducts, which comprises boring the tree in different planes and directions and sawing from each bore across one or more sectors of the tree, so that the areas of severance in different planes marginally overlap, thus severing substantially all the sap ducts of the tree but leaving its upper and lower portions with interlocked tenons.

3. The method or step according to claim 2 wherein the tree is sawed in two pairs of opposite sectors in each of two different planes.

In testimony whereof, I have hereunto signed my name at Philadelphia, Pennsylvania, this 6th day of February, 1925.

HERBERT RENNER.